United States Patent
Byrne

(10) Patent No.: US 11,968,276 B2
(45) Date of Patent: Apr. 23, 2024

(54) PROXY COMMUNICATION SYSTEM THAT TRANSLATES CONTACT IDENTIFIERS

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 534 days.

(21) Appl. No.: 16/877,753

(22) Filed: May 19, 2020

(65) Prior Publication Data

US 2021/0368018 A1    Nov. 25, 2021

(51) Int. Cl.

| | | |
|---|---|---|
| *G06F 15/16* | (2006.01) | |
| *H04L 9/40* | (2022.01) | |
| *H04L 61/59* | (2022.01) | |
| *H04L 67/01* | (2022.01) | |
| *H04L 67/02* | (2022.01) | |
| *H04L 67/56* | (2022.01) | |

(52) U.S. Cl.
CPC ............ *H04L 67/56* (2022.05); *H04L 61/59* (2022.05); *H04L 63/0407* (2013.01); *H04L 67/01* (2022.05); *H04L 67/02* (2013.01)

(58) Field of Classification Search
CPC . H04L 67/28; H04L 61/6013; H04L 63/0407; H04L 67/02; H04L 67/42
USPC .................................................. 709/203
See application file for complete search history.

(56) References Cited

U.S. PATENT DOCUMENTS

| | | | |
|---|---|---|---|
| 8,676,181 B2 | 3/2014 | Pratt et al. | |
| 9,621,495 B1 | 4/2017 | Shumate | |
| 10,560,841 B2 | 2/2020 | Stein et al. | |
| 2003/0185232 A1* | 10/2003 | Moore | H04L 51/00 704/E15.045 |
| 2020/0050795 A1* | 2/2020 | Solomon | G06F 16/2255 |

* cited by examiner

*Primary Examiner* — Suraj M Joshi
*Assistant Examiner* — Joel Mesa
(74) *Attorney, Agent, or Firm* — Lee & Hayes, P.C.

(57) ABSTRACT

A proxy communication system translates contact identifiers. The proxy communication system maps one or more client device contact identifiers to one or more proxy contact identifiers from a pool of proxy contact identifiers. The proxy communication system may facilitate communication on behalf of the client device using the proxy contact identifier. The proxy communication system may also communicate with the client device on behalf of the target device using the client device contact identifier. In some implementations, the mapping may be state dependent, such as different mappings based on a target device contact identifier, recent communications between the client device and the target device, and so on.

20 Claims, 8 Drawing Sheets

PROXY COMMUNICATION SYSTEM THAT TRANSLATES CONTACT IDENTIFIERS

FIELD

The described embodiments relate generally to communication. More particularly, the present embodiments relate to a proxy communication system that translates contact identifiers.

BACKGROUND

People use a variety of different communication technologies to communicate with each other. Examples of such communication technologies include telephone calls, email, text messages, and so on. Communications to people using such communication technologies may typically be addressed using a contact identifier, such as a telephone number for telephone calls or text messages, an email address for email, and so on.

People may restrict access to their contact identifiers. For example, people may have an unlisted telephone number, may specify that their email address may not be shared with business partners, and so on. People may restrict access to their contact identifiers to control the circumstances in which other people communicate with them, to protect their personal information, to reduce unsolicited marketing, and so on.

SUMMARY

The present disclosure relates to a proxy communication system that translates contact identifiers. The proxy communication system maps one or more client device contact identifiers to one or more proxy contact identifiers from a pool of proxy contact identifiers. The proxy communication system may facilitate communication on behalf of the client device using the proxy contact identifier. The proxy communication system may also communicate with the client device on behalf of the target device using the client device contact identifier. In some implementations, the mapping may be state dependent, such as different mappings based on a target device contact identifier, recent communications between the client device and the target device, and so on.

In various embodiments, a proxy communication system that translates contact identifiers includes at least one communication unit, at least one non-transitory storage medium that stores instructions, and at least one processor. The at least one processor executes the instructions to receive a proxy mapping request from a client device using the at least one communication unit, map a client device contact identifier to a proxy contact identifier from a pool of proxy contact identifiers, and facilitate communication with a target device on behalf of the client device via the at least one communication unit using the proxy contact identifier.

In some examples, the proxy contact identifier is a phone number. In various examples, the proxy contact identifier is an email address.

In a number of examples, the at least one processor un-maps the proxy contact identifier from the client device contact identifier in response to a request from the client device. In some examples, the at least one processor facilitates communication with the target device on behalf of the client device by receiving a proxy connection request from the client device, via the at least one communication unit, to communicate with a target device and communicating with the target device on behalf of the client device via the at least one communication unit using the proxy contact identifier. In a number of examples, the at least one processor provides the proxy contact identifier to the target device when communicating with the target device on behalf of the client device. In various examples, the at least one processor facilitates communication with the target device on behalf of the client device by providing the proxy contact identifier to the client device to provide to the target device instead of the client device contact identifier.

In some embodiments, a proxy communication system that translates contact identifiers includes at least one communication unit, at least one non-transitory storage medium that stores instructions, and at least one processor. The at least one processor executes the instructions to receive a communication request, using the at least one communication unit, that addresses a proxy contact identifier from a pool of proxy contact identifiers, determine a mapping of the proxy contact identifier to multiple client device contact identifiers associated with multiple client devices, select a client device contact identifier associated with a client device from the multiple client device contact identifiers, and communicate with the client device on behalf of a target device via the at least one communication unit using the client device contact identifier.

In various examples, the at least one processor selects the client device contact identifier based on a previous communication between the at least one processor and the target device on behalf of the client device. In some examples, the at least one processor selects the client device contact identifier based on a target device contact identifier. In a number of examples, the client device contact identifier includes an extension. In various examples, the at least one processor selects the client device contact identifier based on a previous communication between the client device and the target device on behalf of the client device.

In some examples, the at least one processor maintains a state table in the at least one non-transitory storage medium and selects the client device contact identifier using the state table. In various implementations of such examples, the state table tracks recent transactions.

In a number of embodiments, a proxy communication system that translates contact identifiers includes at least one communication unit, at least one non-transitory storage medium that stores instructions, and at least one processor. The at least one processor executes the instructions to create a mapping between a client device contact identifier for a client device and a proxy contact identifier from a pool of proxy contact identifiers, receive a communication request that addresses the proxy contact identifier from a target device via the at least one communication unit, and communicate with the client device on behalf of the target device via the at least one communication unit using the client device contact identifier.

In various examples, the client device is a first client device, the client device contact identifier is a first client device contact identifier, and the at least one processor changes the mapping from the first client device contact identifier for the first client device to a second client device contact identifier for a second client device. In some examples, the at least one processor changes the mapping to a null contact identifier. In a number of examples, the at least one processor changes the mapping after a time period. In various examples, the at least one processor changes the mapping after completion of an event.

In some examples, the at least one processor is a component of a private branch exchange.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
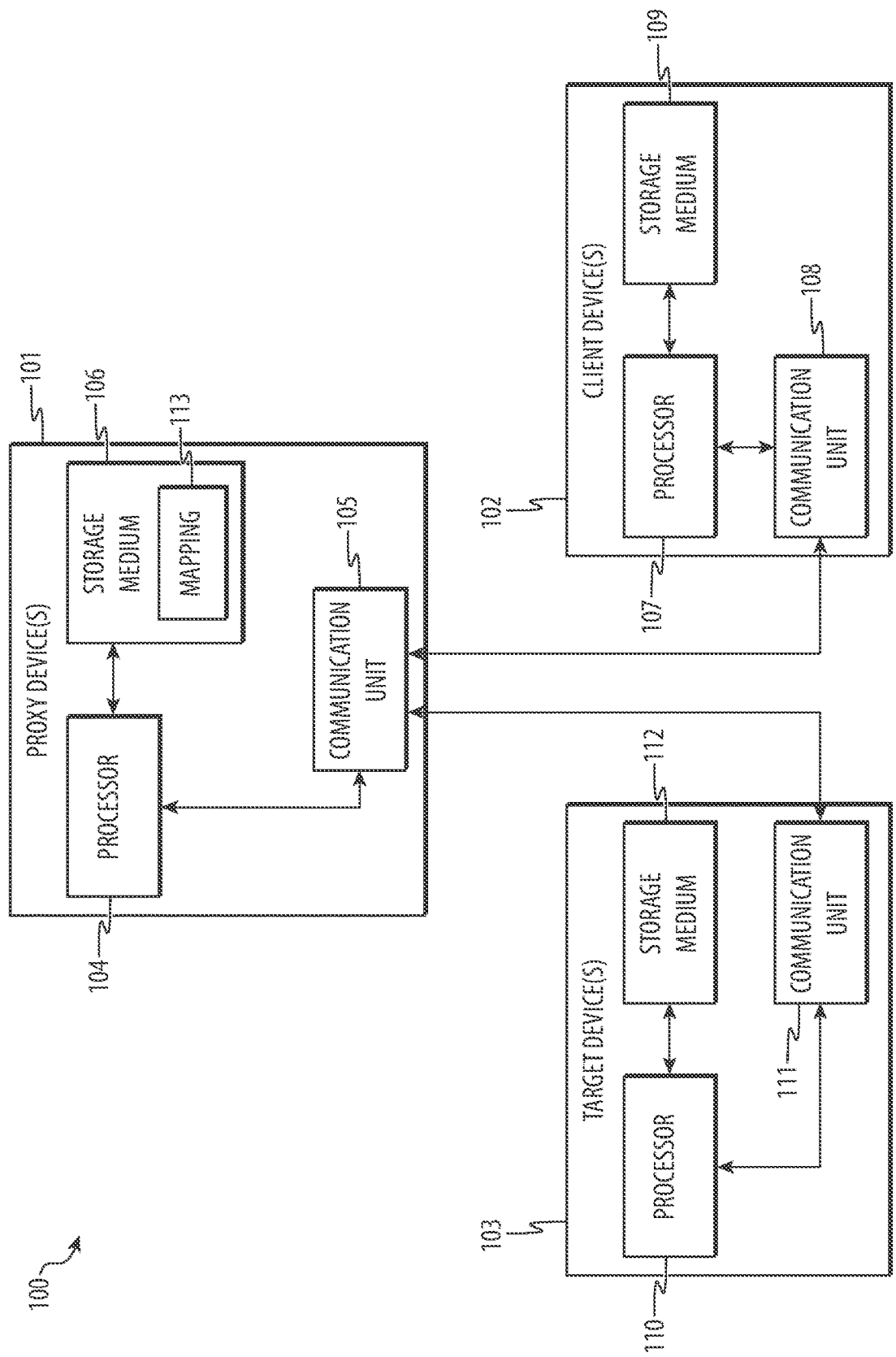
FIG. 1 depicts a first example proxy communication system that translates contact identifiers.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

One way that people may attempt to restrict access to their contact identifiers may be to use anonymous calling to block their telephone number from being provided to other people whom they call. This may prevent the other people from gaining access to their telephone number. However, many people do not answer anonymous calls since anonymous calls are often associated with solicitations or scams. Further, such a technique does not typically provide any way for the other people to call the people back. Though people may use anonymous calling to prevent other people from calling them back indiscriminately, they may still want the other people to be able to call them back under some limited circumstances. Since anonymous calling does not provide this ability, the people would still have to provide their telephone number to the other people, defeating the purpose of using anonymous calling. Other existing solutions have similar issues.

A proxy communication system that translates contact identifiers may overcome these problems. The proxy communication system may have an available pool of contact identifiers, such as telephone numbers, email addresses, text or other message identifiers, and so on. The proxy communication system maps one of this pool to contact identifiers for a client device. For outbound network connections, the client device may make outbound network connections via the proxy communication system, which may complete the network connections using the pool contact identifier instead of the client device contact identifier. For inbound network connection identifiers, an inbound connection may use the pool contact identifier to reach the proxy communication system, which may complete the connection using the mapped client device contact identifier. This may provide configurable anonymity for both outbound and inbound connections in a way that can be reconfigured at any time. Further, the mapping may be dependent on various states (such as different mappings based on the caller or callee) without providing indications that such a proxy communication system is in use, such as is conveyed when callers block their number. This may be configured and de-configured on a per transaction basis for apps or other applications, such as rideshare apps to enable one or more communications between driver and passenger for the duration of the transaction without exposing the personal information of one or both. This may also be used for purposes other than anonymity, such as where the proxy communication system uses the mappings to redirect callers of a general number to the extension of a respective party based on their calling number.

In this way, the system may be able to perform communication anonymizing and/or routing functions that the system would not previously have been able to perform absent the technology disclosed herein. This may also enable the system to provide communication anonymizing and/or routing functions more efficiently while consuming fewer hardware and/or software resources as more resource consuming communication anonymizing and/or routing techniques and/or hardware and/or software components may be omitted, reducing unnecessary hardware and/or software components and providing greater system flexibility.

The following disclosure relates to a proxy communication system that translates contact identifiers. The proxy communication system maps one or more client device contact identifiers to one or more proxy contact identifiers from a pool of proxy contact identifiers. The proxy communication system may facilitate communication on behalf of the client device using the proxy contact identifier. The proxy communication system may also communicate with the client device on behalf of the target device using the client device contact identifier. In some implementations, the mapping may be state dependent, such as different mappings based on a target device contact identifier, recent communications between the client device and the target device, and so on.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 depicts a first example proxy communication system 100 that translates contact identifiers. The system 100 may include one or more proxy devices 101 that are operable to communicate with one or more client devices 102 and one or more target devices 103.

The proxy device 101 may map one or more client device contact identifiers for and/or otherwise associated with the client device 102 to one or more proxy contact identifiers from a pool of proxy contact identifiers associated with the proxy device 101. The proxy device 101 may facilitate communication with the target device 103 on behalf of the client device 102 using the proxy contact identifier. In this way, the communication may appear to the target device 103 as coming from the proxy contact identifier. For example, the proxy device 101 may receive a proxy connection request from the client device 102 to communicate with the target device 103 and may communicate with the target device 103 on behalf of the client device 102 using the proxy contact identifier. Alternatively, the proxy device 101 may provide the proxy contact identifier to the client device 102, which the client device 102 may provide when communicating with the target device 103. The proxy device 101 may also communicate with the client device 102 on behalf of the target device 103 using the client device contact identifier.

In this way, the system 100 may be able to perform communication anonymizing and/or routing functions that the system 100 would not previously have been able to perform absent the technology disclosed herein. This may also enable the system 100 to provide communication anonymizing and/or routing functions more efficiently while consuming fewer hardware and/or software resources as more resource consuming communication anonymizing and/or routing techniques and/or hardware and/or software components may be omitted, reducing unnecessary hardware and/or software components and providing greater system 100 flexibility.

In various implementations, the contact identifiers may be telephone numbers. In other implementations, the contact identifiers may be email addresses and/or any other mechanism used to route communications. Various configurations are possible and contemplated without departing from the scope of the present disclosure.

By way of illustration, a rideshare app executing on the client device 102 may allow a driver to request an anonymized telephone number to use to call a scheduled passenger. Upon request, the client device 102 may contact the proxy device 101. The proxy device 101 may have a contact identifier for the client device 102 with a proxy contact identifier. The proxy device 101 may initiate communication with the target device 103 associated with the scheduled passenger. The proxy device 101 may provide the proxy contact identifier to the target device 103 as part of such communication. The scheduled passenger may subsequently try to contact the driver using the proxy contact identifier. The proxy device 101 may receive the communication, determine that the proxy contact identifier maps to the contact identifier for the client device 102, and communicate with the client device 102 using the contact identifier for the client device 102. For example, the proxy device 101 may forward the communication to the client device 102, route the communication to the client device 102, exchange data for the communication between the target device 103 and the client device 102, and so on.

In some implementations, the mapping may be state dependent. For example, the proxy device 101 may create and use different mappings for different target device contact identifiers associated with different target devices 103. By way of illustration, two different people may call a general insurance number. Each person may have a different agent assigned to their policy. The proxy device 101 may use telephone numbers associated with the people to consult a state table, determine the respective agent associated with each person, determine the contact identifier associated with each respective agent, and route each person to their respective agent's call queue.

By way of another illustration, the proxy device 101 may create and use different mappings based on previous communications between one or more client devices 102 and one or more target devices 103. For example, a customer service line may use a single telephone number for a number of different customer service representatives. Each customer service representative may be associated with a different extension. When a person calls the customer service telephone number, the proxy device 101 may consult a state table to see if a contact identifier associated with the respective target device 103 recently communicated with a client device 102 associated with one of the customer service agents. If not, the proxy device 101 may route the call to a general queue for a next available customer service agent. However, if the person recently communicated with a particular customer service agent, the proxy device 101 may route the call to the extension of that customer service agent. This may allow the person to reach the customer service agent they were speaking to without waiting in the general queue if accidentally disconnected. This may also allow the person to speak again to the customer service agent who may already be familiar with the person's situation, may still have information for the person and/or the person's issue accessible on the customer service agent's computer and/or other device, and so on.

As discussed above, the proxy device 101 may have an available pool of contact identifiers, such as telephone numbers, email addresses, text or other message identifiers, and so on. The proxy device 101 may map one of this pool to contact identifiers for the client device 102, and/or subsequently un-map (such as to re-map the one of the pool to another client device 102, to a null contact identifier that is not associated with a client device 102 in order to block communication, and so on). For outbound network connections, the client device 102 may make outbound network connections via the proxy device 101, which may complete the network connections using the pool contact identifier instead of the client device contact identifier. For inbound network connection identifiers, an inbound connection may use the pool contact identifier to reach the proxy device 101, which may complete the connection using the mapped client device contact identifier. This may provide configurable anonymity for both outbound and inbound connections in a way that can be reconfigured at any time.

As further discussed above, the mapping may be dependent on various states (such as different mappings based on a caller, based on a callee, and so on) without providing indications that such a proxy communication system is in use, such as is conveyed when callers block their number. This may be configured and de-configured on a per transaction basis for apps or other applications, such as rideshare apps to enable one or more communications between driver and passenger for the duration of the transaction without exposing the personal information of one or both. This may also be used for purposes other than anonymity, such as where the proxy communication system uses the mappings to redirect callers of a general number to the extension of a respective party based on their calling number.

In various implementations, the proxy device 101 may receive a proxy mapping request from the client device. The proxy device 101 may map a client device contact identifier for the client device 102 to a proxy contact identifier from a pool of proxy contact identifiers. The proxy device 101 may facilitate communication with the target device 103 on behalf of the client device 102 using the proxy contact identifier.

The proxy device 101 may subsequently receive a request from the client device 102 to un-map the client device contact identifier. For example, the client device 102 may be done using the proxy contact identifier and may want to prevent further communications from the proxy contact identifier. As such, the proxy device 101 may un-map the client device contact identifier from the proxy contact identifier and re-map the proxy contact identifier elsewhere, such as to another client device contact identifier, to a null contact identifier that is not associated with a client device 102 in order to block communication, and so on.

In some implementations, the proxy device 101 may receive a communication request that addresses a proxy contact identifier from a pool of proxy contact identifiers. The proxy device 101 may determine a mapping of the proxy contact identifier to multiple client device contact identifiers associated with multiple client devices 102. The proxy device 101 may select a client device contact identifier associated with a client device 102 from the multiple client device contact identifiers and communicate with the client device 102 on behalf of a target device 103.

The proxy device 101 may select the client device contact identifier using a state table. The state table may track recent transactions. For example, the state table may track recent communications between the client device 102 and the target device 103, between the proxy device 101 and the target device 103 on behalf of the client device 102, and so on. The proxy device 101 may use such recently tracked communications to select client device contact identifiers that are associated with recent communications with the target device 103.

In a number of implementations, the proxy device 101 may create a mapping between a client device contact identifier for a client device 102 and a proxy contact identifier from a pool of proxy contact identifiers. The proxy device 101 may receive a communication request that addresses the proxy contact identifier from a target device 103. In response, the proxy device 101 may communicate with the client device 102 on behalf of the target device 103 using the client device contact identifier.

The proxy device 101 may subsequently change the mapping. For example, the proxy device 101 may change the mapping after a time period (such as thirty minutes, a day, and so on), upon completion of a transaction or other event, upon request from the client device 102, and so on.

In various implementations, the proxy device 101 and/or the client device 102 may provide additional information beyond just the proxy contact identifier when communicating with the target device 103. For example, telephones often display a name (such as a person's name, the name of a business, and so on) when displaying a calling number related to an incoming call. As there may be as much reason to restrict access to an actual name of a person or entity associated with the client device 102 as there is to restrict access to the client device contact identifier associated with the client device 102, the proxy device 101 and/or the client device 102 may provide a replacement name instead of the actual name of the person or entity associated with the client device 102 when communicating with the target device 103. For example, a person named "Francine Jones" may be associated with the client device 102, but the proxy device 101 and/or the client device 102 may provide the name "Frank Smith" instead of "Francine Jones" when communicating with the target device 103. This additional information may be stored in and/or associated with the mapping.

By way of another example, the system 100 may be used by the driver of a rideshare app named "Fred Rockwell" using the driver's personal cell phone to contact a passenger for purposes of locating the passenger for a pickup. However, the passenger may not know who the driver is and may ignore the call. As such, the system 100 may replace the name "Fred Rockwell" with the name of the rideshare app so that the passenger knows who is calling and knows that the caller is authorized to communicate on behalf of the rideshare app. Various configurations are possible and contemplated without departing from the scope of the present disclosure.

The proxy device 101 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, set top boxes, digital media players, a private branch exchange component, and so on. The proxy device 101 may include one or more processors 104 and/or other processing units and/or controllers, one or more non-transitory storage media 106 (which may take the form of, but is not limited to, a magnetic storage medium; optical storage medium; magneto-optical storage medium; read only memory; random access memory; erasable programmable memory; flash memory; and so on), one or more communication units 105, and/or other components. The processor may execute instructions stored in the non-transitory storage medium 106 to perform various functions. Such functions may include maintaining a pool of proxy contact identifiers, mapping client device contact identifiers to proxy contact identifiers, maintaining a state table, evaluating a state table, storing the mapping 113 and/or state table in the non-transitory storage medium 106, communicating with the client device 102 and/or the target device 103 via the communication unit 105 and/or one or more communication networks, facilitating communication between the client device 102 and the target device 103, receiving mapping requests, receiving un-mapping requests, selecting client device contact identifiers, un-mapping client device contact identifiers from proxy contact identifiers, and so on.

Similarly, the client device 102 may be any kind of electronic device. The client device 102 may include one or more processors 107 and/or other processing units and/or controllers, one or more non-transitory storage media 109, one or more communication units 108, and/or other components. The processor 107 may execute instructions stored in the non-transitory storage medium 109 to perform various functions. Such functions may include requesting proxy mapping, requesting proxy connection, communicating with the proxy device 101 and/or the target device 103 via the communication unit, and so on.

Likewise, the target device 103 may be any kind of electronic device. The target device 103 may include one or more processors 110 and/or other processing units and/or controllers, one or more non-transitory storage media 112, one or more communication units 111, and/or other components. The processor 110 may execute instructions stored in the non-transitory storage medium 112 to perform various functions. Such functions may include requesting communication with the proxy device 101 via the communication unit 111, communication with the client device 102 via the communication unit 111, and so on.

Although the system 100 is illustrated and described as including particular components arranged in a particular configuration, it is understood that this is an example. In a number of implementations, various configurations of various components may be used without departing from the scope of the present disclosure.

For example, the system 100 is illustrated and described as the proxy device 101 directly communicating with the client device 102 and the target device 103 using the same communication unit 105. However, it is understood that this is an example. In various implementations, the proxy device 101 may include multiple communication units 105, one or more of which may be used to communicate with the client device 102 (such as via an internal and/or other first network) while one or more others may be used to communicate with the target device 103 (such as via an external and/or other second network). Various configurations are possible and contemplated without departing from the scope of the present disclosure.

Figure 2:
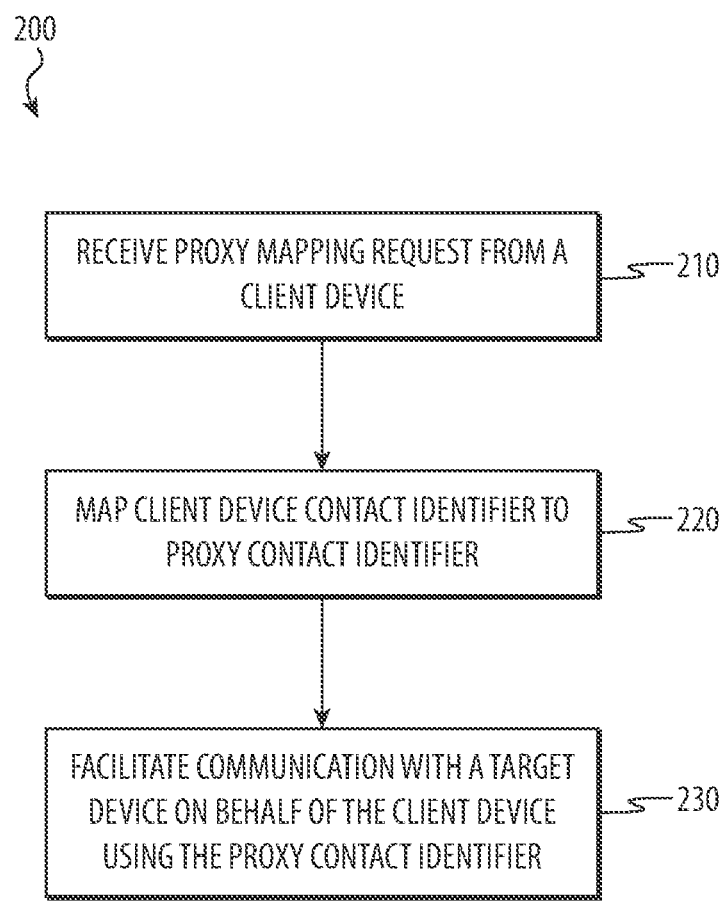
FIG. 2 depicts a flow chart illustrating a first example method for proxy communication system translation of contact identifiers. This method may be performed by the system of FIG. 1.

FIG. 2 depicts a flow chart illustrating a first example method 200 for proxy communication system translation of contact identifiers. This method 200 may be performed by the system 100 of FIG. 1.

At operation 210, an electronic device (such as the proxy device 101 of FIG. 1) may receive a proxy mapping request from a client device. For example, the request may specify a client device contact identifier and request a proxy contact identifier to use for communication with a target device instead of the client device contact identifier.

At operation 220, the electronic device may map the client device contact identifier to a proxy contact identifier. For example, the electronic device may maintain and/or have access to a pool of multiple proxy contact identifiers. The electronic device may map one or more of this pool to one or more client device contact identifiers.

At operation 230, the electronic device may facilitate communication with a target device on behalf of the client device using the proxy contact identifier. For example, the electronic device may receive a proxy connection request from the client device to communicate with the target device and may communicate with the target device on behalf of the client device using the proxy contact identifier. The electronic device may provide the proxy contact identifier to the target device when communicating with the target device on behalf of the client device. By way of another example, the electronic device may provide the proxy contact identifier to the client device for the client device to provide to the target device instead of the client device contact identifier when the client device communicates with the target device directly.

In various examples, this example method 200 may be implemented as a group of interrelated software modules or components that perform various functions discussed herein. These software modules or components may be executed within a cloud network and/or by one or more computing devices, such as the proxy device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, operation 210 is illustrated and described as the electronic device receiving a proxy mapping request from a client device. However, it is understood that this is an example. In some implementations, the electronic device may map a client device contact identifier to a proxy contact identifier without receiving a request. Various configurations are possible and contemplated without departing from the scope of the present disclosure.

Figure 3:
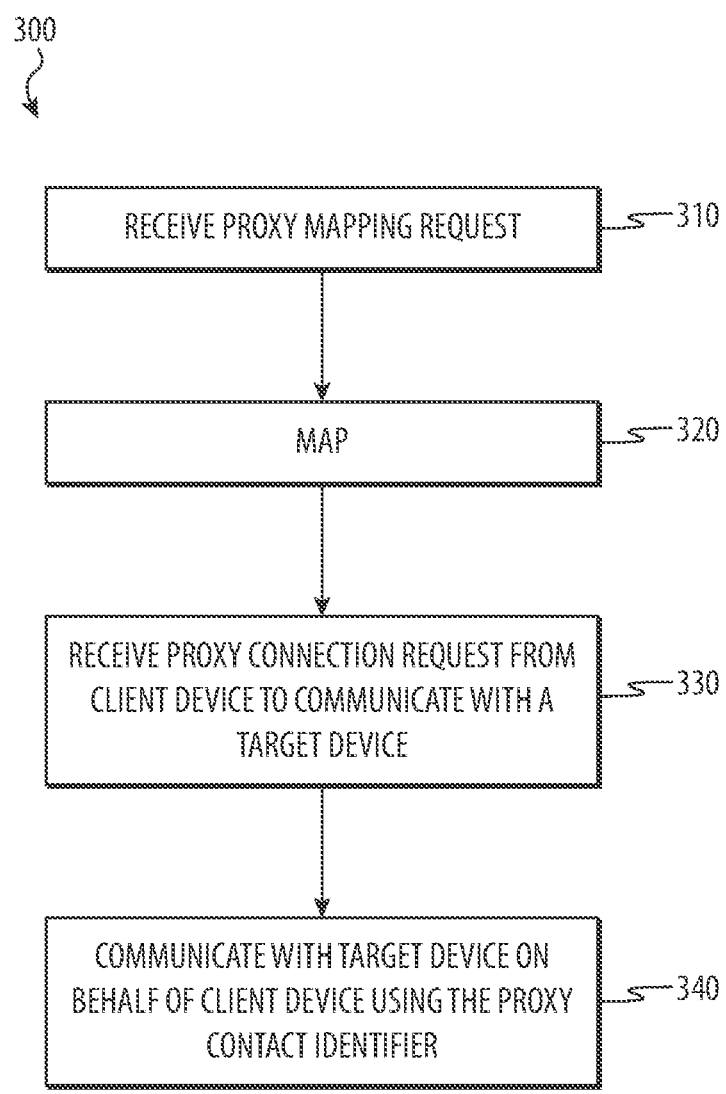
FIG. 3 depicts a flow chart illustrating a second example method for proxy communication system translation of contact identifiers. This method may be performed by the system of FIG. 1.

FIG. 3 depicts a flow chart illustrating a second example method 300 for proxy communication system translation of contact identifiers. This method 300 may be performed by the system 100 of FIG. 1.

At operation 310, an electronic device (such as the proxy device 101 of FIG. 1) may receive a proxy mapping request. The proxy mapping request may be to map one or more telephone number, email address, messaging identifier, and/or other client device contact identifier to one or more proxy contact identifiers. At operation 320, the electronic device may perform the mapping.

At operation 330, the electronic device may receive a proxy connection request from a client device associated with the proxy mapping request to communicate with a target device. The proxy connection request may request to communicate with the target device using the mapped proxy connection identifier.

At operation 340, the electronic device may communicate with the target device on behalf of the client device using the proxy contact identifier. As part of communicating with the target device on behalf of the client device, the electronic device may provide the proxy contact identifier to the target device instead of a client device contact identifier associated with the client device. In some examples, the electronic device may relay one or more exchanges of data between the client device and the target device for the communication. In other examples, the electronic device may initiate the communication, whereupon the client device and the target device subsequently communicate directly. Various configurations are possible and contemplated without departing from the scope of the present disclosure.

In various examples, this example method 300 may be implemented as a group of interrelated software modules or components that perform various functions discussed herein. These software modules or components may be executed within a cloud network and/or by one or more computing devices, such as the proxy device 101 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as the client device initiating contact with the target device. However, it is understood that this is an example. In some implementations, the electronic device may be operable to use the proxy contact identifier to initiate communication with the client device on behalf of the target device. Various configurations are possible and contemplated without departing from the scope of the present disclosure.

Figure 4:
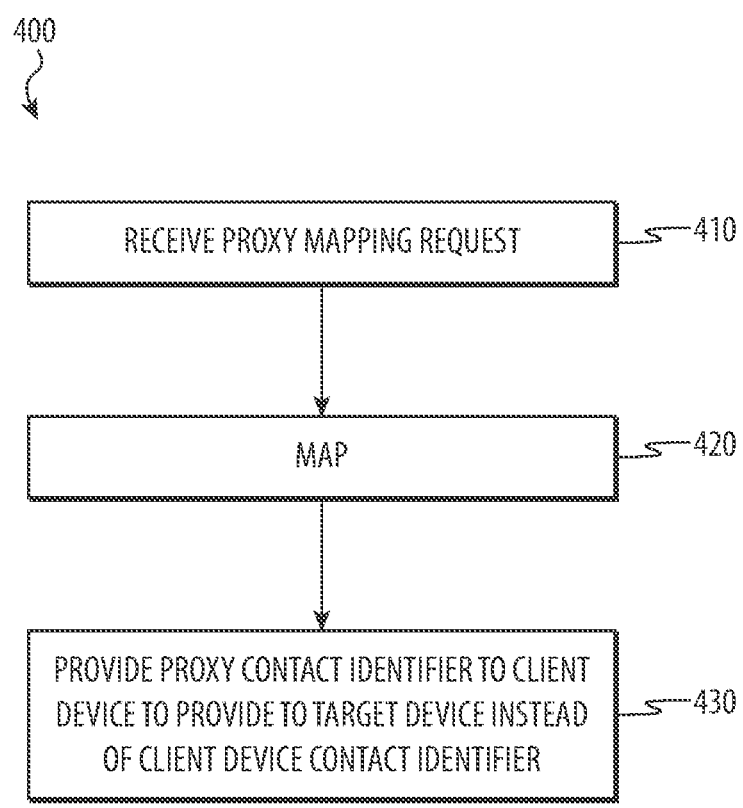
FIG. 4 depicts a flow chart illustrating a third example method for proxy communication system translation of contact identifiers. This method may be performed by the system of FIG. 1.

FIG. 4 depicts a flow chart illustrating a third example method 400 for proxy communication system translation of contact identifiers. This method 400 may be performed by the system 100 of FIG. 1.

At operation 410, an electronic device (such as the proxy device 101 of FIG. 1) may receive a proxy mapping request. At operation 420, the electronic device may generate a mapping in response to the request. At operation 430, the proxy device may provide a proxy contact identifier associated with the mapping to a client device associated with the mapping for the client device to provide to the target device instead of a client device contact identifier associated with the client device. The client device may provide the proxy contact identifier to the target device instead of a client device contact identifier when communicating with the target device.

In various examples, this example method 400 may be implemented as a group of interrelated software modules or components that perform various functions discussed herein. These software modules or components may be executed within a cloud network and/or by one or more computing devices, such as the proxy device 101 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, operation 430 is illustrated and described as the electronic device providing the proxy contact identifier to the client device. However, it is understood that this is an example. In some implementations, the electronic device may provide the proxy contact identifier to the target device. By way of illustration, the electronic device may provide the proxy contact identifier to the target device instead of the client device contact identifier when communicating with the target device on behalf of the client device. Various configurations are possible and contemplated without departing from the scope of the present disclosure.

Figure 5:
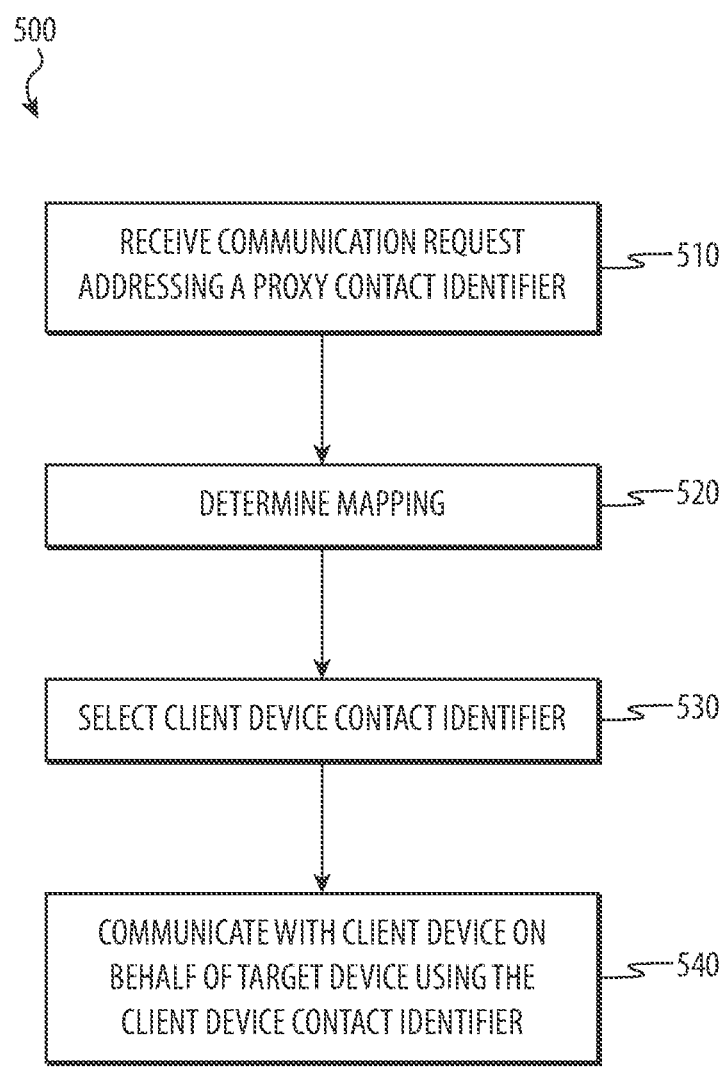
FIG. 5 depicts a flow chart illustrating a fourth example method for proxy communication system translation of contact identifiers. This method may be performed by the system of FIG. 1.

FIG. 5 depicts a flow chart illustrating a fourth example method 500 for proxy communication system translation of contact identifiers. This method 500 may be performed by the system 100 of FIG. 1.

At operation 510, an electronic device (such as the proxy device 101 of FIG. 1) may receive a communication request addressing a proxy contact identifier. The electronic device may receive the communication request from a target device.

At operation 520, the electronic device may determine a mapping associated with the proxy contact identifier. At operation 530, the electronic device may select a client device contact identifier using the mapping. In some examples, the mapping may be between the proxy contact identifier and a single client device contact identifier. In other examples, the mapping may be between the proxy contact identifier and multiple client device contact identifiers. In such an example, the electronic device may select the client device contact identifier from the multiple client device contact identifiers. The electronic device may perform such a selection based on previous communications with the target device associated with the client device contact identifier, based on a target device contact identifier associated with the target device, based on a state table, and so on.

At operation 540, the electronic device may communicate with a client device on behalf of a target device using the client device contact identifier. The electronic device may communicate with the client device by routing the communication request to the client device, by passing messages back and forth between the client device and the target device, by initiating a communication between the target device and the client device, and so on.

By way of illustration, two different people may call a general insurance number. Each person may have a different agent assigned to their policy. The electronic device may use telephone numbers associated with the people to consult a state table, determine the respective agent associated with each person, and determine the contact identifier associated with each respective agent. By way of another illustration, the electronic device may create and use different mappings based on previous communications. For example, a customer service line may use a single telephone number for a number of different customer service representatives. Each customer service representative may be associated with a different extension. When a person calls the customer service telephone number, the electronic device may consult a state table to see if a contact identifier associated with the person recently communicated with one of the customer service agents.

In various examples, this example method 500 may be implemented as a group of interrelated software modules or components that perform various functions discussed herein. These software modules or components may be executed within a cloud network and/or by one or more computing devices, such as the proxy device 101 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as including the separate operations of determining mapping and selecting a client device contact identifier. However, it is understood that this is an example. In some implementations, a single operation may select a client device contact identifier using such a mapping. In such an implementation, multiple operations may not be performed. Various configurations are possible and contemplated without departing from the scope of the present disclosure.

Figure 6:
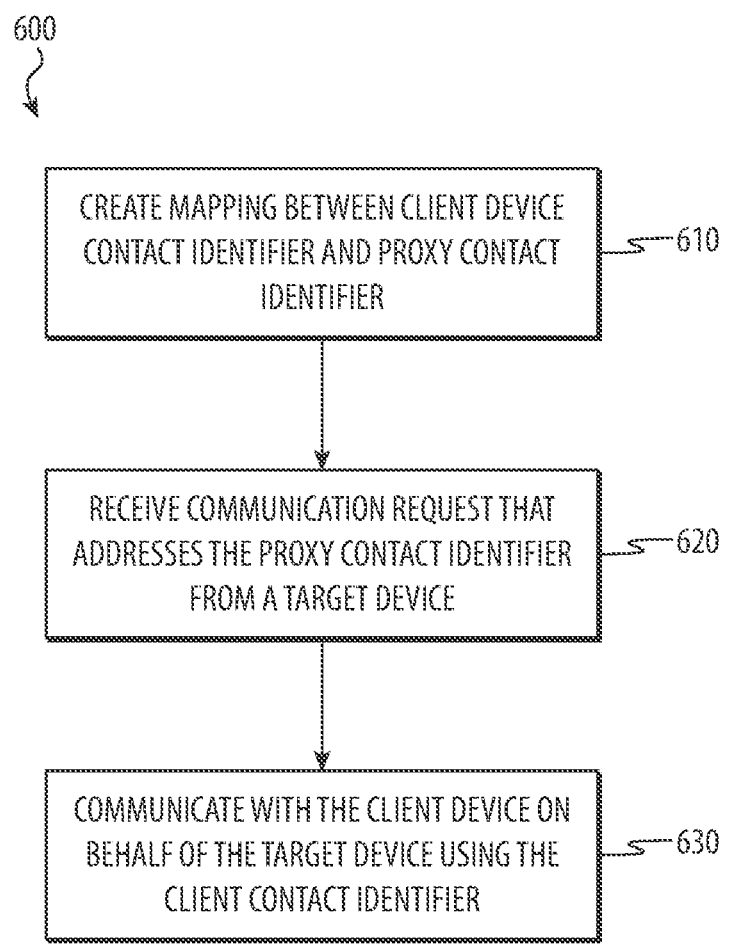
FIG. 6 depicts a flow chart illustrating a fifth example method for proxy communication system translation of contact identifiers. This method may be performed by the system of FIG. 1.

FIG. 6 depicts a flow chart illustrating a fifth example method 600 for proxy communication system translation of contact identifiers. This method 600 may be performed by the system 100 of FIG. 1.

At operation 610, an electronic device (such as the proxy device 101 of FIG. 1) may create a mapping between a client device contact identifier and a proxy contact identifier. At operation 620, the electronic device may receive a communication request that addresses the proxy contact identifier from a target device. At operation 630, the electronic device may communicate with the client device on behalf of the target device using the client device contact identifier associated with the client device.

For example, upon receiving a communication request from a target device that addresses the proxy contact identifier, the electronic device may look up in the mapping to determine the client device contact identifier that is mapped to the proxy contact identifier. The electronic device may then use the determined client device contact identifier to communicate with the client device on behalf of the target device.

In various examples, this example method 600 may be implemented as a group of interrelated software modules or components that perform various functions discussed herein. These software modules or components may be executed within a cloud network and/or by one or more computing devices, such as the proxy device 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, operation 630 is illustrated and described as the electronic device communicating with the client device on behalf of the target device using the client device contact identifier. However, it is understood that this is an example.

In some implementations, the electronic device may forward the communication request to the client device using the client device contact identifier instead of communicating with the client device on behalf of the target device. Various configurations are possible and contemplated without departing from the scope of the present disclosure.

Figure 7:
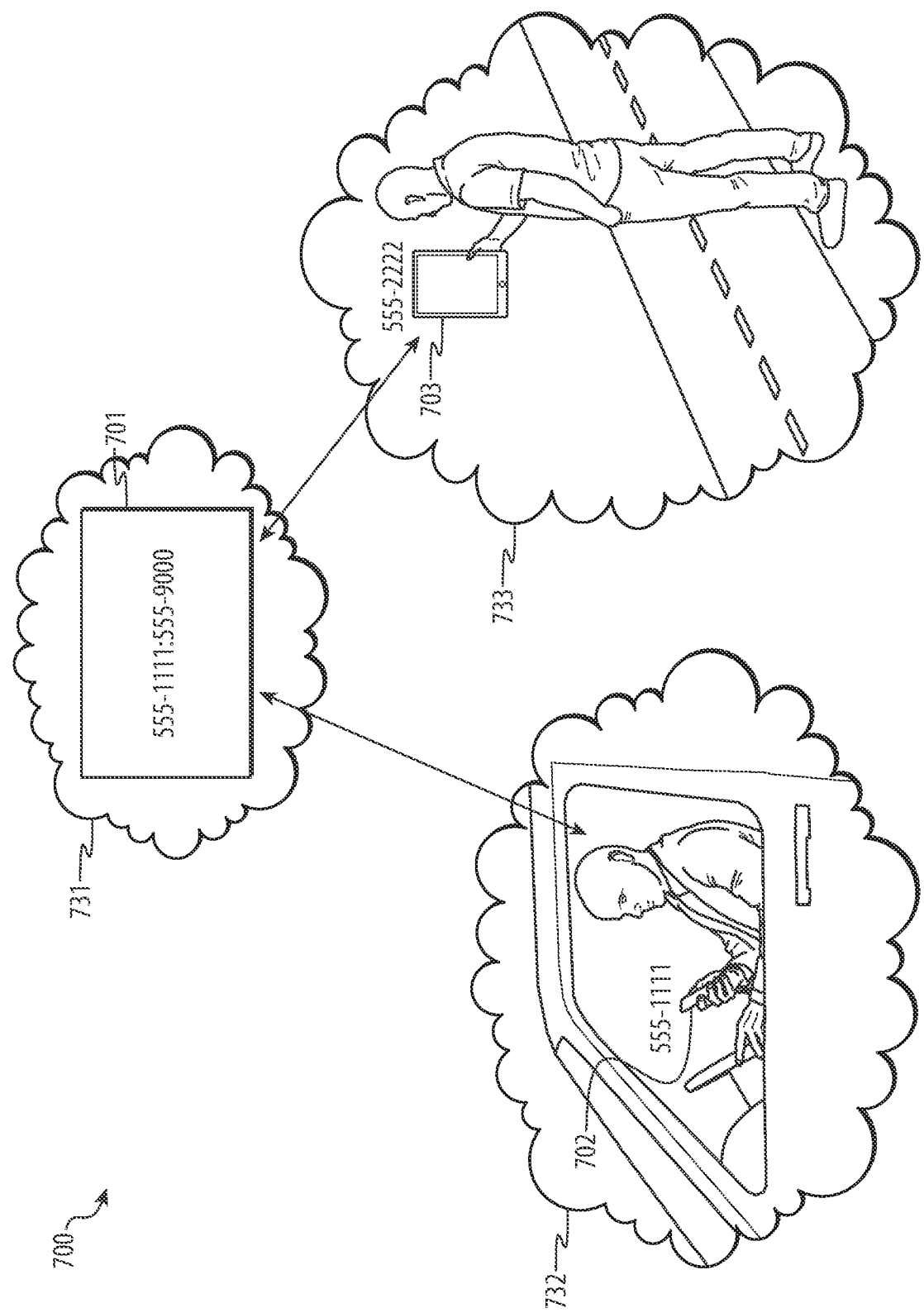
FIG. 7 depicts a first example of translation of contact identifiers performed by a proxy communication system such as the system of FIG. 1.

FIG. 7 depicts a first example 700 of translation of contact identifiers performed by a proxy communication system, such as the system 100 of FIG. 1. In this first example 700, a rideshare app driver at a first location 732 may wish to contact a passenger at a second location 733 to locate the passenger for pickup. The driver may not wish to share the driver's telephone number (illustrated as 555-1111) with the passenger. As such, the driver may use a mobile device 702 associated with the 555-1111 telephone number to submit a proxy mapping request to a proxy device 701 at a third location 731. The proxy device 701 may map the 555-1111 telephone number to a 555-9000 proxy telephone number and may facilitate communication with a tablet computing device 703 of the passenger that is associated with a 555-2222 telephone number using the 555-9000 proxy telephone number instead of the 555-1111 telephone number. Subsequently, the proxy device 701 may be able to receive communication requests from the tablet computing device 703 that address the 555-9000 proxy telephone number to initiate communication with the mobile device 702 without the tablet computing device 703 using the 555-1111 telephone number. When the ride is complete, the driver may use the mobile device 702 to request the proxy device 701 un-map the 555-1111 telephone number from the 555-9000 proxy telephone number. Various configurations are possible and contemplated without departing from the scope of the present disclosure.

Figure 8:
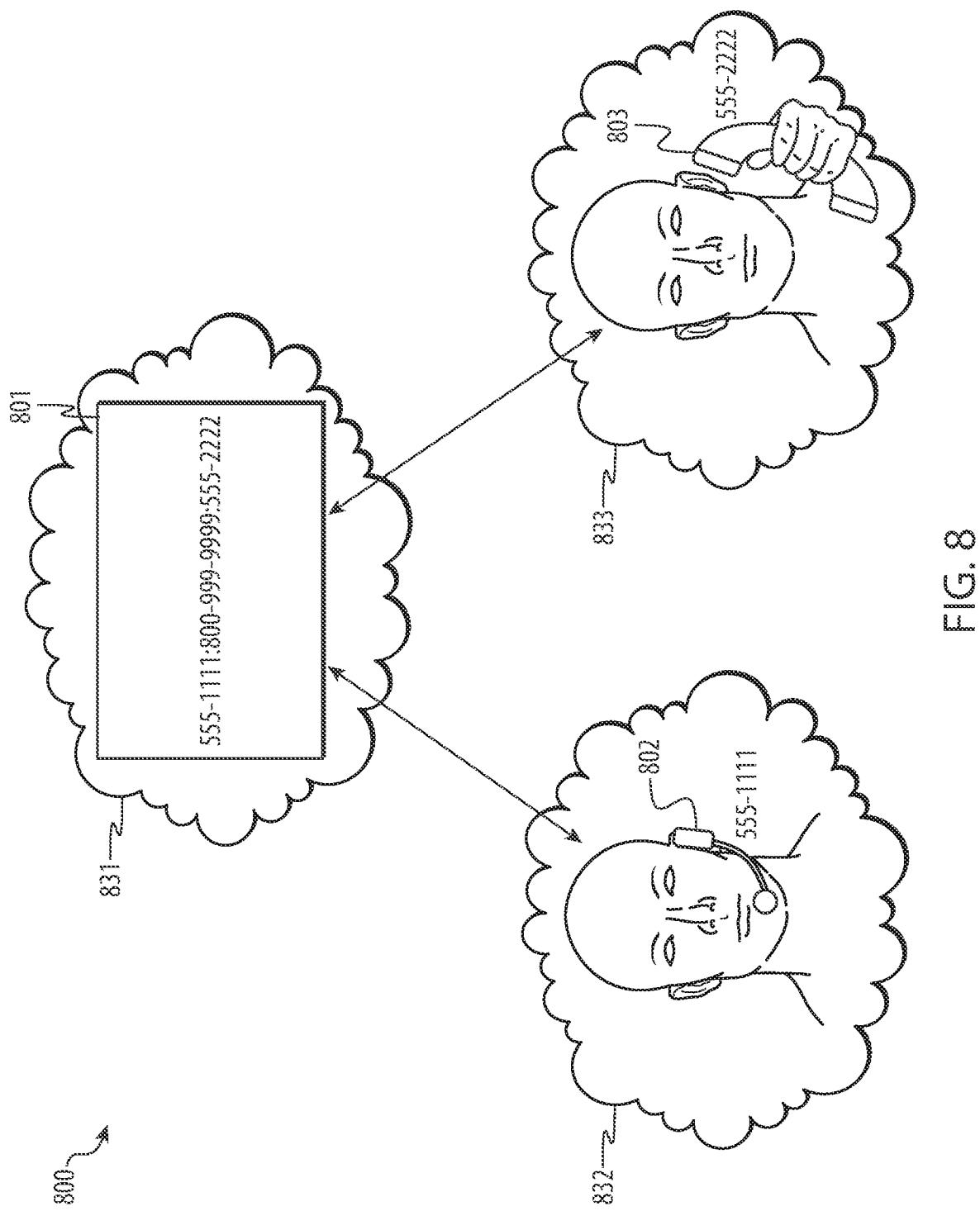
FIG. 8 depicts a second example of translation of contact identifiers performed by a proxy communication system such as the system of FIG. 1.

FIG. 8 depicts a second example 800 of translation of contact identifiers performed by a proxy communication system, such as the system 100 of FIG. 1. In this second example 800, a cell phone service plan salesperson at a first location 832 may use a headset 802 associated with a 555-1111 telephone number to call a landline 803 of a person at a second location 833 associated with a 555-2222 telephone number. The cell phone service plan salesperson may sell cell phone service plans for a company. The cell phone service plan salesperson may use the headset 802 to call the person via a proxy device 801 that maps the 555-1111 telephone number to a 800-999-9999 company telephone number that is used for all outgoing cell phone service plan sales calls. This may be done so that call recipients can trust that the calls are coming from the company. However, the cell phone service plan salesperson and the person may be interrupted during their call and the person may use the landline 803 to attempt to call the cell phone service plan salesperson back at the 800-999-9999 company telephone number. Rather than routing the person to the general call queue for the company, the proxy device 801 may consult a state table to determine that the person and the cell phone service plan salesperson were recently communicating, map the 555-2222 telephone number to the mapping between the 555-1111 telephone number and the 800-999-9999 company telephone number, and route the person's call to the headset 802 so that the person and the cell phone service plan salesperson can continue their call. Various configurations are possible and contemplated without departing from the scope of the present disclosure.

In various implementations, a proxy communication system that translates contact identifiers may include at least one communication unit, at least one non-transitory storage medium that stores instructions, and at least one processor. The at least one processor may execute the instructions to receive a proxy mapping request from a client device using the at least one communication unit, map a client device contact identifier to a proxy contact identifier from a pool of proxy contact identifiers, and facilitate communication with a target device on behalf of the client device via the at least one communication unit using the proxy contact identifier.

In some examples, the proxy contact identifier may be a phone number. In various examples, the proxy contact identifier may be an email address.

In a number of examples, the at least one processor may un-map the proxy contact identifier from the client device contact identifier in response to a request from the client device. In some examples, the at least one processor may facilitate communication with the target device on behalf of the client device by receiving a proxy connection request from the client device, via the at least one communication unit, to communicate with a target device and communicating with the target device on behalf of the client device via the at least one communication unit using the proxy contact identifier. In a number of examples, the at least one processor may provide the proxy contact identifier to the target device when communicating with the target device on behalf of the client device. In various examples, the at least one processor may facilitate communication with the target device on behalf of the client device by providing the proxy contact identifier to the client device to provide to the target device instead of the client device contact identifier.

In some embodiments, a proxy communication system that translates contact identifiers may include at least one communication unit, at least one non-transitory storage medium that stores instructions, and at least one processor. The at least one processor may execute the instructions to receive a communication request, using the at least one communication unit, that addresses a proxy contact identifier from a pool of proxy contact identifiers, determine a mapping of the proxy contact identifier to multiple client device contact identifiers associated with multiple client devices, select a client device contact identifier associated with a client device from the multiple client device contact identifiers, and communicate with the client device on behalf of a target device via the at least one communication unit using the client device contact identifier.

In various examples, the at least one processor may select the client device contact identifier based on a previous communication between the at least one processor and the target device on behalf of the client device. In some examples, the at least one processor may select the client device contact identifier based on a target device contact identifier. In a number of examples, the client device contact identifier may include an extension. In various examples, the at least one processor may select the client device contact identifier based on a previous communication between the client device and the target device on behalf of the client device.

In some examples, the at least one processor may maintain a state table in the at least one non-transitory storage medium and selects the client device contact identifier using the state table. In various such examples, the state table may track recent transactions.

In a number of embodiments, a proxy communication system that translates contact identifiers may include at least one communication unit, at least one non-transitory storage medium that stores instructions, and at least one processor. The at least one processor may execute the instructions to create a mapping between a client device contact identifier for a client device and a proxy contact identifier from a pool of proxy contact identifiers, receive a communication request that addresses the proxy contact identifier from a target device via the at least one communication unit, and communicate with the client device on behalf of the target device via the at least one communication unit using the client device contact identifier.

In various examples, the client device may be a first client device, the client device contact identifier may be a first client device contact identifier, and the at least one processor may change the mapping from the first client device contact identifier for the first client device to a second client device contact identifier for a second client device. In some examples, the at least one processor may change the mapping to a null contact identifier. In a number of examples, the at least one processor may change the mapping after a time period. In various examples, the at least one processor may change the mapping after completion of an event.

In some examples, the at least one processor may be a component of a private branch exchange.

As described above and illustrated in the accompanying figures, the present disclosure relates to a proxy communication system that translates contact identifiers. The proxy communication system maps one or more client device contact identifiers to one or more proxy contact identifiers from a pool of proxy contact identifiers. The proxy communication system may facilitate communication on behalf of the client device using the proxy contact identifier. The proxy communication system may also communicate with the client device on behalf of the target device using the client device contact identifier. In some implementations, the mapping may be state dependent, such as different mappings based on a target device contact identifier, recent communications between the client device and the target device, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A proxy communication system that translates contact identifiers, comprising:
   at least one communication unit;
   at least one non-transitory storage medium that stores instructions; and
   at least one processor that executes the instructions to:
      receive a proxy mapping request from a client device using the at least one communication unit;
      map a client device contact identifier to a proxy contact identifier from a pool of proxy contact identifiers; and
      facilitate communication with a target device on behalf of the client device via the at least one communication unit using the proxy contact identifier.

2. The proxy communication system of claim 1, wherein the proxy contact identifier is a phone number.

3. The proxy communication system of claim 1, wherein the proxy contact identifier is an email address.

4. The proxy communication system of claim 1, wherein the at least one processor un-maps the proxy contact identifier from the client device contact identifier in response to a request from the client device.

5. The proxy communication system of claim 1, wherein the at least one processor facilitates communication with the target device on behalf of the client device by:
   receiving a proxy connection request from the client device, via the at least one communication unit, to communicate with the target device; and
   communicating with the target device on behalf of the client device via the at least one communication unit using the proxy contact identifier.

6. The proxy communication system of claim 1, wherein the at least one processor provides the proxy contact identifier to the target device when communicating with the target device on behalf of the client device.

7. The proxy communication system of claim 1, wherein the at least one processor facilitates communication with the target device on behalf of the client device by providing the proxy contact identifier to the client device to provide to the target device instead of the client device contact identifier.

8. A proxy communication system that translates contact identifiers, comprising:
   at least one communication unit;
   at least one non-transitory storage medium that stores instructions; and
   at least one processor that executes the instructions to:
      receive a communication request, using the at least one communication unit, that addresses a proxy contact identifier from a pool of proxy contact identifiers;
      determine a mapping of the proxy contact identifier to multiple client device contact identifiers associated with multiple client devices;
      select a client device contact identifier associated with a client device from the multiple client device contact identifiers; and
      communicate with the client device on behalf of a target device via the at least one communication unit using the client device contact identifier.

9. The proxy communication system of claim 8, wherein the at least one processor selects the client device contact identifier based on a previous communication between the at least one processor and the target device on behalf of the client device.

10. The proxy communication system of claim 8, wherein the at least one processor selects the client device contact identifier based on a target device contact identifier.

11. The proxy communication system of claim 8, wherein the client device contact identifier includes an extension.

12. The proxy communication system of claim 8, wherein the at least one processor selects the client device contact identifier based on a previous communication between the client device and the target device on behalf of the client device.

13. The proxy communication system of claim 8, wherein the at least one processor:
   maintains a state table in the at least one non-transitory storage medium; and
   selects the client device contact identifier using the state table.

14. The proxy communication system of claim 13, wherein the state table tracks recent transactions.

15. A proxy communication system that translates contact identifiers, comprising:
   at least one communication unit;
   at least one non-transitory storage medium that stores instructions; and
   at least one processor that executes the instructions to:
      create a mapping between a client device contact identifier for a client device and a proxy contact identifier from a pool of proxy contact identifiers;
      receive a communication request that addresses the proxy contact identifier from a target device via the at least one communication unit; and
      communicate with the client device on behalf of the target device via the at least one communication unit using the client device contact identifier.

16. The proxy communication system of claim 15, wherein:
   the client device is a first client device;
   the client device contact identifier is a first client device contact identifier; and
   the at least one processor changes the mapping from the first client device contact identifier for the first client device to a second client device contact identifier for a second client device.

17. The proxy communication system of claim 15, wherein the at least one processor changes the mapping to a null contact identifier.

18. The proxy communication system of claim 15, wherein the at least one processor changes the mapping after a time period.

19. The proxy communication system of claim 15, wherein the at least one processor changes the mapping after completion of an event.

20. The proxy communication system of claim 15, wherein the at least one processor is a component of a private branch exchange.

\* \* \* \* \*